US012465816B2

(12) United States Patent
Andreescu et al.

(10) Patent No.: US 12,465,816 B2
(45) Date of Patent: Nov. 11, 2025

(54) COMMUNICATIONS PROTOCOL FOR SOFTWARE DRIVEN EXERCISE DEVICES

(71) Applicant: Zwift, Inc., Long Beach, CA (US)

(72) Inventors: Alexandru Andreescu, London (GB); Davide Pollarolo, London (GB)

(73) Assignee: Zwift, Inc., Long Beach, CA (US)

( * ) Notice: Subject to any disclaimer, the term of this patent is extended or adjusted under 35 U.S.C. 154(b) by 210 days.

(21) Appl. No.: 18/334,105

(22) Filed: Jun. 13, 2023

(65) Prior Publication Data

US 2024/0416181 A1 Dec. 19, 2024

(51) Int. Cl.
A63B 24/00 (2006.01)

(52) U.S. Cl.
CPC ................................ *A63B 24/0087* (2013.01)

(58) Field of Classification Search
CPC ....... H04W 4/80; H04L 67/12; A63B 24/0087
See application file for complete search history.

(56) References Cited

U.S. PATENT DOCUMENTS

| 9,338,638 | B1* | 5/2016 | Palin ..................... H04W 12/37 |
| 11,610,664 | B2* | 3/2023 | Foley ...................... A63F 13/90 |
| 11,633,647 | B2* | 4/2023 | Fedriga .............. A63B 24/0075 |
| | | | 482/5 |
| 11,908,564 | B2* | 2/2024 | Baudhuin .......... A63B 24/0062 |
| 12,005,302 | B2* | 6/2024 | Manzke ............... A63B 23/047 |
| 2002/0045519 | A1* | 4/2002 | Watterson .......... A63B 22/0023 |
| | | | 482/54 |
| 2006/0058155 | A1* | 3/2006 | Kumar ................... G16H 40/67 |
| | | | 482/4 |
| 2010/0248905 | A1* | 9/2010 | Lu ....................... A63B 22/0605 |
| | | | 482/57 |
| 2015/0018660 | A1* | 1/2015 | Thomson ............... A61B 5/332 |
| | | | 600/393 |
| 2015/0296020 | A1* | 10/2015 | Granqvist ............... H04L 67/51 |
| | | | 455/41.2 |
| 2016/0023043 | A1* | 1/2016 | Grundy .................. A63B 59/00 |
| | | | 482/8 |
| 2017/0208428 | A1* | 7/2017 | Lim ...................... H04W 12/06 |
| 2017/0334522 | A1* | 11/2017 | Zahid .................... H04W 4/029 |

(Continued)

OTHER PUBLICATIONS

European Patent Office, Extended European Search Report for application No. EP 23185232.8. mail date Jan. 8, 2024. 10 pages.

*Primary Examiner* — Chris Parry
*Assistant Examiner* — Hassan Abdur-Rahman Khan
(74) *Attorney, Agent, or Firm* — SoCal IP Law Group LLP; Jonathan Pearce

(57) ABSTRACT

There is disclosed a method of operating a server device for use in conjunction with software operating on a client device to engage in exercise, the method includes establishing a three-part communication connection between the server device and the client device. The three parts are a first connection which is an asynchronous channel for transmission of streamed data to a receiving device, a second connection which is a transmission channel for transmission of messages that require a response from a receiving device, and a third connection which is a receiving channel for receipt of messages that are responses to a device requesting a response. The method then simultaneously communicates a first set of data over the first connection and a second set of data over at least one of the second connection and the third connection.

20 Claims, 9 Drawing Sheets

(56) References Cited

U.S. PATENT DOCUMENTS

| | | | |
|---|---|---|---|
| 2019/0111318 A1* | 4/2019 | Evancha | A63B 24/0087 |
| 2019/0151714 A1* | 5/2019 | Baudhuin | G16H 20/30 |
| 2020/0045533 A1* | 2/2020 | Varanasi | G06F 16/27 |
| 2020/0269090 A1* | 8/2020 | Fedriga | A63B 21/225 |
| 2020/0272311 A1* | 8/2020 | Rotta | H04N 21/42201 |
| 2020/0276475 A1* | 9/2020 | Casalini | G16H 20/30 |
| 2021/0060380 A1* | 3/2021 | Hawkins, III | A63B 23/0476 |
| 2021/0060384 A1* | 3/2021 | Choi | A63B 24/0062 |
| 2021/0146192 A1* | 5/2021 | Smits | A63B 21/0087 |
| 2021/0162260 A1* | 6/2021 | Norfleet-Vilaro | A63B 24/0087 |
| 2021/0236882 A1* | 8/2021 | Fedriga | A63B 21/0051 |
| 2022/0032115 A1* | 2/2022 | Mallard | A63B 21/0059 |
| 2022/0223254 A1* | 7/2022 | Foley | A63B 24/0084 |
| 2022/0296979 A1* | 9/2022 | Rauzier | A63B 24/0062 |
| 2022/0331638 A1* | 10/2022 | Lafrance | A63B 24/0087 |
| 2024/0092447 A1* | 3/2024 | Reed | G06N 3/09 |
| 2024/0387017 A1* | 11/2024 | Bradley | G16H 50/20 |

* cited by examiner

COMMUNICATIONS PROTOCOL FOR SOFTWARE DRIVEN EXERCISE DEVICES

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to communications protocols and, more particularly to a protocol for communicating with software used to engage in exercise in conjunction with one or more accessory devices.

Description of the Related Art

Over the last several, years, the gamification of exercise and the integration of social networks or network effects more generally with sports has become commonplace. Companies like Peloton® have known that adding the ability of cyclists to compete against one another in a virtual spinning class is more likely to increase engagement, keep exercisers engaged and returning, and to enable individuals to be better-equipped to reach their fitness goals.

In a similar space, Zwift® has offered its customers the ability to go on "road" style races within a virtual environment along said that customer's friends. The resulting experience has been a hit. Players arrange to meet up with one another to practice, ride, and even to compete in races. Players may interact with each other both in and outside of the game. Zwift offers a social networking component and feeds somewhat of a traditional trait of many cyclists: competitiveness. That players can see each other's progress, compare statistics, and engage in side-by-side races with athletes hundreds or thousands of miles away offers a unique set of experiences that Zwift's customers enjoy.

Zwift relies upon a virtual game world in which players interact. Players can move through the virtual world, exercising as they go, with their digital avatar representing their position and exercise effort within that world. Other systems rely upon video classes with instructors in the form of rowing instruction, spinning instruction, weight training, and the like. Typically, these experiences are shown on a display in front of the exercising individual.

To enable Zwift and other, similar, exercise systems to function and ensure a relative uniformity of experiences for its riders, Zwift is primarily reliant upon so-called "trainers." Trainers are devices that apply resistance to purpose-mounted outdoor cycles or to purpose-built indoor cycles. Typically, a trainer will replace the back wheel of a traditional, outdoor bicycle. In some cases, a trainer will rely upon a roller engaging with a back wheel of a traditional, outdoor bicycle. A trainer is distinguished from an indoor cycle in that it is designed to be mounted to any number of outdoor cycles to thereby create a resistance bicycle where previously there was only a traditional two-wheeled, outdoor bicycle. Without fail, when the word "trainer" is used herein, a so-called "smart" trainer is intended-meaning a trainer that can vary its resistance as directed by software operating on a computing device in communication with that trainer.

Increasingly, Zwift is also operable with purpose-built indoor cycles that are, in essence, trainers permanently (or temporarily) mounted on a "bicycle" (which may or may not have two wheels) and which is designed for the integration of a resistance device. Zwift and other software systems can function in much the same way with other variable, computer-controlled resistance exercise systems. These can include rowing machines, treadmills (though this is not usually resistance, it is typically speed and incline adjustment), resistance weight machines, and traditional indoor cycles. Any exercise device that operates using software-controlled resistance or variable speed could be controlled using the protocol described herein.

In addition, manufacturers are increasingly adding functionality to these rides. Most riders use a fan, primarily simply to keep themselves cool. Riding can be intense. But, there are fans that simulate the speed at which a rider is moving in an exercise. Likewise, there are front-mounted devices that raise and lower the front of a mounted bicycle to simulate going up and down hills. Still other devices simulate "lean" as a rider leans into a turn to try and better simulate the virtual environment. Shifting gears is common in cycling, downshifting to go up hills and upshifting to go down. Increasingly, indoor cycles and trainer-mounted cycles incorporate shifters, both wireless and physically connected by wires. Rowing machines can simulate currents or rougher waters. Treadmills can incline or decline to simulate road conditions.

One element that is relevant here is that the system utilizes software to control resistance or speed or other characteristics. In some of those cases, the same company controls the entire system (e.g. Peloton). However, in other cases the software must designed to be able to communicate with various exercise devices which may be connected to the software. In such a case, a uniform communication protocol may be advisable. Bluetooth® low energy protocol exists and enables energy-efficient data transmission, but its capabilities are limited. Likewise, FTMS (Fitness Machine Service) protocol is available. However, its capabilities are also limited as it was designed some time ago and the numerous elements set forth above (e.g. incline or lean or shifting) were not expected. It would be beneficial if there were a protocol designed with present software-controlled exercise in mind and with the option for expandability in the future. It would be beneficial if the protocol would reduce overall latency, while being more robust, and conserving power. It would likewise be beneficial if the software device could operate as a central communication hub through which all connected devices communicate.

Figure 1:
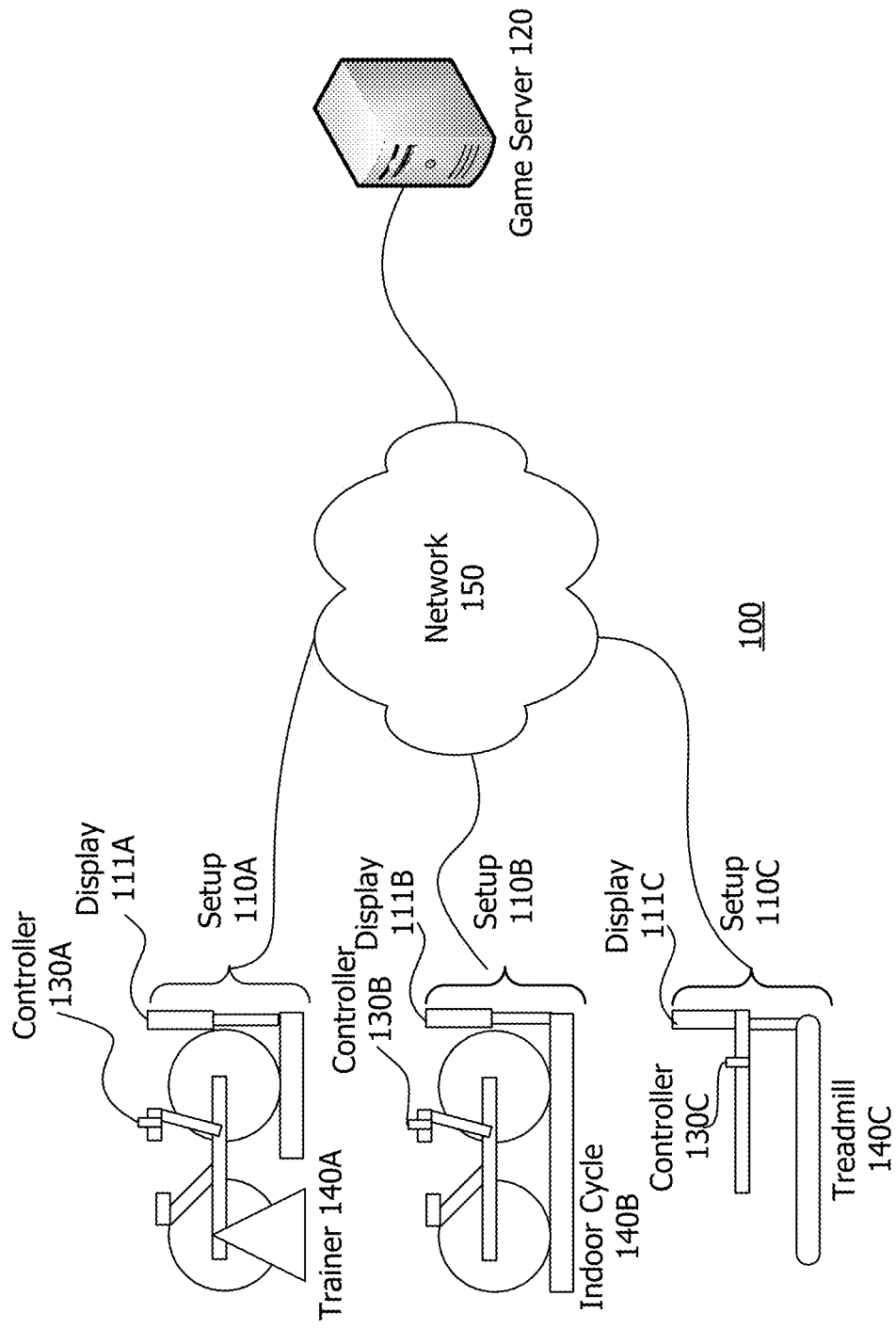
FIG. 1 is an overview of an exercise device communications system.

Throughout this description, elements appearing in figures are assigned three-digit reference designators, where the most significant digit is the figure number where the element is first introduced and the two least significant digits are specific to the element. An element that is not described in conjunction with a figure may be presumed to have the same characteristics and function as a previously described element having the same reference designator.

ASPECTS OF THE DISCLOSURE

Non-limiting aspects of the disclosure are set out in the following non-limiting clauses:

1. A method of operating an exercise device for use in conjunction with software, the method comprising:
   establish a three-part communication connection between a server device and a client device, wherein:
      a first connection is an asynchronous channel for transmission of messages that need not be acknowledged by a receiving device,
      a second connection is a synchronous transmission channel for transmission of messages that require a response from a receiving device,
      a third connection is a synchronous receiving channel for receipt of messages that are responses to a message that requires a response;
   transmit a first set of data over the first connection, the first set of data being a stream of data that is relevant to the operation of the client device in conjunction with the server device, but for which confirmation of receipt is not required;
   substantially simultaneously transmit or receive a second set of data, comprising a subset of a predetermined set of requests and responses, using at least one of the second and third connections, the second set of data comprising data which requires a confirmation of receipt and may require a response; and
   wherein the first interface and at least one of the second interface and third interface are configured to be open for simultaneous communication.
2. The method of clause 1 wherein the server device is the exercise device and the client device is a computing device operating using the software.
3. The method of clause 1 or clause 2 wherein the three-part communication connection joins the server device and the client device by a selected one of: universal serial bus (USB), 802.11x wireless, and Bluetooth®.
4. The method of clause 3 wherein a format for a packet used by the three-part communication connection that relies upon a custom implementation of Bluetooth® is:
   a single byte operations code for the packet; and
   a message portion of a length one less byte than the connection type is capable of carrying.
5. The method of clause 3 wherein a format for a packet used by the three-part communication connection that relies upon USB or 802.11x wireless connection is:
   a single byte identifying the length of the packet;
   a single byte operations code for the packet; and
   a message portion of a length one or two less bytes than the connection type is capable of carrying.
6. The method of any preceding clause wherein the first connection is used for transmitting messages selected from the group comprising: notifications from the exercise device, notifications from the software to the exercise device, event flagging messages, notifications from a controller device, notifications from a battery device, notifications indicating wireless internet status, lighting and/or sound effect event status notifications, intermediate game state events, notifications from a secondary controller device, notifications related to a battery status of a secondary exercise device, notifications that the secondary exercise device has paired with the software, notifications that the exercise device or the secondary exercise device has engaged a virtual gear shift process in software, notification regarding a spindown of the exercise device or a secondary exercise device, and notification that the software has lost control over the exercise device or secondary exercise device.
7. The method of any preceding clause wherein the second connection is used for transmitting messages selected from the group comprising: a setting for the exercise device set by the software, a setting for the software for the exercise device to operate, a request to have the exercise device operate as a bridge between the software or a third device and a fourth device, a request to have the exercise device power off, a calibration setting for a touch surface controlled by the exercise device, a calibration setting for the exercise device or a secondary exercise device, a request to reset the exercise device, a request to cause a lighting element to have a selected setting, animation, or status, a request to set a setting for the secondary exercise device, a request to set one or more settings for the exercise device or for the secondary exercise device, and a request to begin a spindown of the exercise device or a secondary exercise device.
8. The method of any preceding clause wherein the third connection is used for receiving messages selected from the group comprising: a notification regarding development information or status from the software, a notification regarding a configuration of the exercise device, a status of an ongoing data transfer from the server device to the client device, a notification of the status of lighting elements controlled by the exercise device, a notification on the diagnostic status of the exercise device, a notification of the status of a battery associated with the exercise device, a notification of a version of the exercise device, a notification regarding the SSID of a wireless network, a notification of a version of a secondary exercise device, a notification regarding an error in lighting elements controlled by the exercise device, a notification regarding the status of a setting of the exercise device or the secondary exercise device, a notification regarding a touch surface associated with the exercise device or the secondary exercise device, a notification regarding an updating status for firmware updates to the exercise device or the secondary exercise device, notifications from a log associated with the exercise device or the secondary exercise device, notifications indicating a fault with the exercise device or the secondary exercise device, notification regarding a calibration or calibration status for the exercise device or the secondary exercise device, notifications indicating that a firmware update has completed and is now locked, notifications related to information for the secondary exercise device, notifications identifying a particular version of the secondary exercise device, and notifications indicating that the three-part communication connection is supported by the server device.

9. The method of any preceding clause wherein the three-part communication connection is established when at least one of the following conditions is met:
   universal serial bus (USB) enumeration is completed and a communications device class is selected;
   the exercise device is connected to a computing device operating the software;
   a custom implementation of Bluetooth®, compatible with the software and indicating that the exercise device implements the custom implementation of Bluetooth® is discovered by the software operating on the computing device and is configured to open the three-way communications connection; and
   a TCP/IP session is established between the exercise device and the software operating on the computing device, and a port is configured to transmit wireless TCP data.

10. A computer program configured to perform the method of any preceding clause when executed on one or more processors.

11. An electronic device comprising:
    one or more processors; and
    memory storing a computer program configured to perform the method of any of clauses 1 to 9 when executed on the one or more processors.

12. A method of operating a server device for use in conjunction with software operating on a client device to engage in exercise, the method comprising:
    establish a three-part communication connection between the server device and the client device, wherein:
      a first connection is an asynchronous channel for transmission of streamed data to a receiving device,
      a second connection is a transmission channel for transmission of messages that require a response from a receiving device,
      a third connection is a receiving channel for receipt of messages that are responses to a message that requests a response;
    substantially simultaneously communicate a first set of data over the first connection and a second set of data over at least one of the second connection and the third connection with both the first and the second set of data passing between the server device and the client device using the three-part communication connection; and
    wherein the first interface and at least one of the second interface and third interface are configured to be open for simultaneous communication.

13. The method of clause 12 wherein the server device is the exercise device and the client device is a computing device operating using the software.

14. The method of clause 12 or clause 13 wherein the three-part communication connection joins the server device and the client device by a selected one of: universal serial bus (USB), 802.11x wireless, and Bluetooth®.

15. The method of clause 14 wherein a format for a packet used by the three-part communication connection that relies upon a custom implementation of Bluetooth® is:
    a single byte operations code for the packet; and
    a message portion of a length one less byte than the connection type is capable of carrying.

16. The method of clause 15 wherein a format for a packet used by the three-part communication connection that relies upon USB or 802.11x wireless connection is:
    a single byte identifying the length of the packet;
    a single byte operations code for the packet; and
    a message portion of a length one or two less bytes than the connection type is capable of carrying.

17. The method of any of clauses 12 to 16 wherein the first connection is used for transmitting messages selected from the group comprising: notifications from the server device, notifications from the software to the server device, event flagging messages, notifications from a controller device, notifications from a battery of the controller device, notifications indicating wireless internet status, lighting and sound effect event status notifications, intermediate game state events, notifications from a secondary controller device, notifications related to a battery status of an exercise device, notifications that the exercise device has paired with the software, notifications that the exercise device has engaged a virtual gear shift process in software, notifications regarding a spindown of the exercise device, and notification that the software has lost control over the exercise device.

18. The method of any of clauses 12 to 17 wherein the second connection is used for transmitting messages selected from the group comprising: a setting for the server device set by the software, a setting for the software for the exercise device to operate, a request to have the server device operate as a bridge between the software or a third device and a fourth device, a request to have the server device power off, a calibration setting for a touch surface controlled by the server device, a calibration setting for the server device or an exercise device, a request to reset the server device, a request to cause a lighting element to have a selected setting, animation, or status, a request to set a setting for the exercise device, a request to set one or more settings for the exercise device, and a request to begin a spindown of the exercise device.

19. The method of any of clauses 12 to 18 wherein the third connection is used for receiving messages selected from the group comprising: a notification regarding development information or status from the software, a notification regarding a configuration of the server device, a status of an ongoing data transfer from the server device to the client device, a notification of the status of lighting elements controlled by the server device, a notification on the diagnostic status of the server device, a notification of the status of a battery associated with the server device, a notification of a version of the server device, a notification regarding the SSID of a wireless network, a notification of a version of an exercise device, a notification regarding an error in lighting elements controlled by the server device, a notification regarding the status of a setting of the serve device or the exercise device, a notification regarding a touch surface associated with the server device or the exercise device, a notification regarding an updating status for firmware updates to the server device or the exercise device, notifications from a log associated with the server device or the exercise device, notifications indicating a fault with the server device or the exercise device, notification regarding a calibration or calibration status for the server device or the exercise device, notifications indicating that a firmware update has completed and is now locked, notifications related to information for the exercise device, notifications identifying a particular version of the exercise device, and notifications indicating that the three-part communication connection is supported by the server device.

20. The method of any of clauses 12 to 19 wherein the three-part communication connection is established when at least one of the following conditions is met:
   universal serial bus (USB) enumeration is completed and a communications device class is selected;
   the server device is connected to a computing device operating the software;
   a custom implementation of Bluetooth®, compatible with the software and indicating that the server device implements the custom implementation of Bluetooth® is discovered by the software operating on the computing device and is configured to open the three-way communications connection; and
   a TCP/IP session is established between the server device and the software operating on the computing device, and a port is configured to transmit wireless TCP data.

21. A computer program configured to perform the method of any of clauses 12 to 20 when executed on one or more processors.

22. A computing device operating as a server using server software, the server software executing on a processor accessible to the computing device to cause the processor to:
   establish a three-part communication connection between the computing device and a client device, wherein:
      a first connection is an asynchronous channel for transmission of streamed data to the client device,
      a second connection is a transmission channel for transmission of messages that require a response from the client device,
      a third connection is a receiving channel for receipt of messages that are responses to the client device requesting a response;
   simultaneously communicate data over the first connection and at least one of the second and third connections with both the first and the second set of data passing between the computing device and the client device using the three-part communication connection; and
   wherein the first interface and at least one of the second interface and third interface are configured to be open for simultaneous communication.

23. The computing device of clause 22 wherein the computing device is a selected one of: a handheld controller, a bicycle trainer, an indoor cycle, a rowing machine, a treadmill, a resistance weight training device, a frame of an exercise device, a bicycle frame or portion thereof, a heart monitor, a bike computer, a device for simulating pitch or yaw of an exercise device, a device for physically simulating an environment in which exercise is taking place, and a set of lighting components used in connection with an exercise software.

24. A client device for engaging in exercise, the client device being configured to:
   establish a three-part communication connection between a server device and the client device, wherein:
      a first connection is an asynchronous channel for transmission of streamed data from the server device to the client device,
      a second connection is a transmission channel for transmission of messages that require a response from a receiving device,
      a third connection is a receiving channel for receipt of messages that are responses to a message that requests a response; and
   substantially simultaneously receive a first set of data over the first connection and engage in communication of a second set of data over at least one of the second connection and the third connection.

25. A method of operating a client device, the method comprising:
   establishing a three-part communication connection between a server device and the client device, wherein:
      a first connection is an asynchronous channel for transmission of streamed data from the server device to the client device,
      a second connection is a transmission channel for transmission of messages that require a response from a receiving device,
      a third connection is a receiving channel for receipt of messages that are responses to a message that requests a response; and
   substantially simultaneously receiving a first set of data over the first connection and engage in communication of a second set of data over at least one of the second connection and the third connection.

26. A computer program configured to perform the method of clause 25 when executed on one or more processors.

DETAILED DESCRIPTION

Description of Apparatus

FIG. 1 is an overview of an exercise device communications system 100. The system 100 includes a series of setups 110A, 110B, and 110C, a game server 120, a series of controllers 130A, 130B, and 130C, a trainer 140A, an indoor cycle 140B, and a treadmill 140C, all interconnected by a network 150.

The setup 110A is made up of the display 111A, controller 130A, and trainer 140A. A setup as used herein means a complete set of equipment to engage in exercise. The display 111A is at least a display for showing an ongoing exercise routine, class, or gamified world in which exercise is taking place. Preferably, the display 111A is likewise a computing device (FIG. 3) capable of executing software to enable the exercise routine, class, or gamified world to be displayed. If the display 111A is not itself a computing device, then the display 111A must be in communications with a computing device to accomplish those tasks. The computing device is an integral part of a setup, like setup 110A The setup 110B is similar to setup 110A except that there is no trainer used. Instead an indoor cycle 140B is used here. Display 111B and controller 130B are likewise present with similar functions discussed above and below.

The setup 110C is similar to setups 110A and 110B, except a treadmill 140C is used here. Display 111C and controller 130C are likewise present with similar functions discussed above and below.

The game server 120 is a computing device operating software which maintains the state of all connected players (or class participants). The game sever 120 preferably enables setups 110A, 110B, and 110C to connect thereto to engage in exercise as directed by the game server 120. The game server 120 may merely serve spinning classes or similar classes in video form as a streaming device (or a plurality of streaming devices). Or, the game server 120 may act very much like a game server in a non-exercise context, enabling authenticated connection by users to engage with a virtual world to which the setups 110A, 110B, and 110C connect to participate. The game server 120 may be a single computing device but is preferably a scalable cloud service with multiple computing devices in various locations throughout the world.

The controllers 130A, 130B, and 130C are remote control devices that operate in conjunction with software operating on the display 111A, 111B, or 111C to control some aspect of the respective setup. Controllers 130A, 130B, and 130C (FIG. 5) operate, for example, to send signals adjusting the resistance applied by the trainer 140A, indoor cycle 140B, or the speed of the treadmill 140C. Controllers 130A-130C may include joysticks or motion controllers and can be used to steer through a virtual world or to select one or more elements within the software operating on the displays 111A-111C.

The trainer 140A is a resistance device that applies resistance (or negative resistance—acceleration) to the setup 110A. The trainer 140A is in communication with the software operating on the computing device (e.g. in the display 111A) to alter the resistance applied as directed by the software. In the case of Zwift, the resistance may be increased as a rider's virtual avatar ascends a hill within the game. Alternatively, the rider's resistance may be decreased as a rider descends a hill, obtains a power-up, or drafts behind another rider. Braking or gear shifts may be simulated—as directed by the software—to correspond to signals indicating those changes. So, for example, the controller 130A may indicate to the software that a gear shift has been entered. If so, the trainer 140A may be directed by the software operating on the display 111A to simulate a gear shift or to actually engage a physical gear shift if a physical set of gears is present.

The indoor cycle 140B and treadmill 140C operate substantially the same as trainer 140, but the indoor cycle 140B is integrated into the setup 110B and the treadmill 140C alters speed and incline, but not resistance, but otherwise operates in a similar manner to the trainer 140A in setup 110A.

Figure 2:
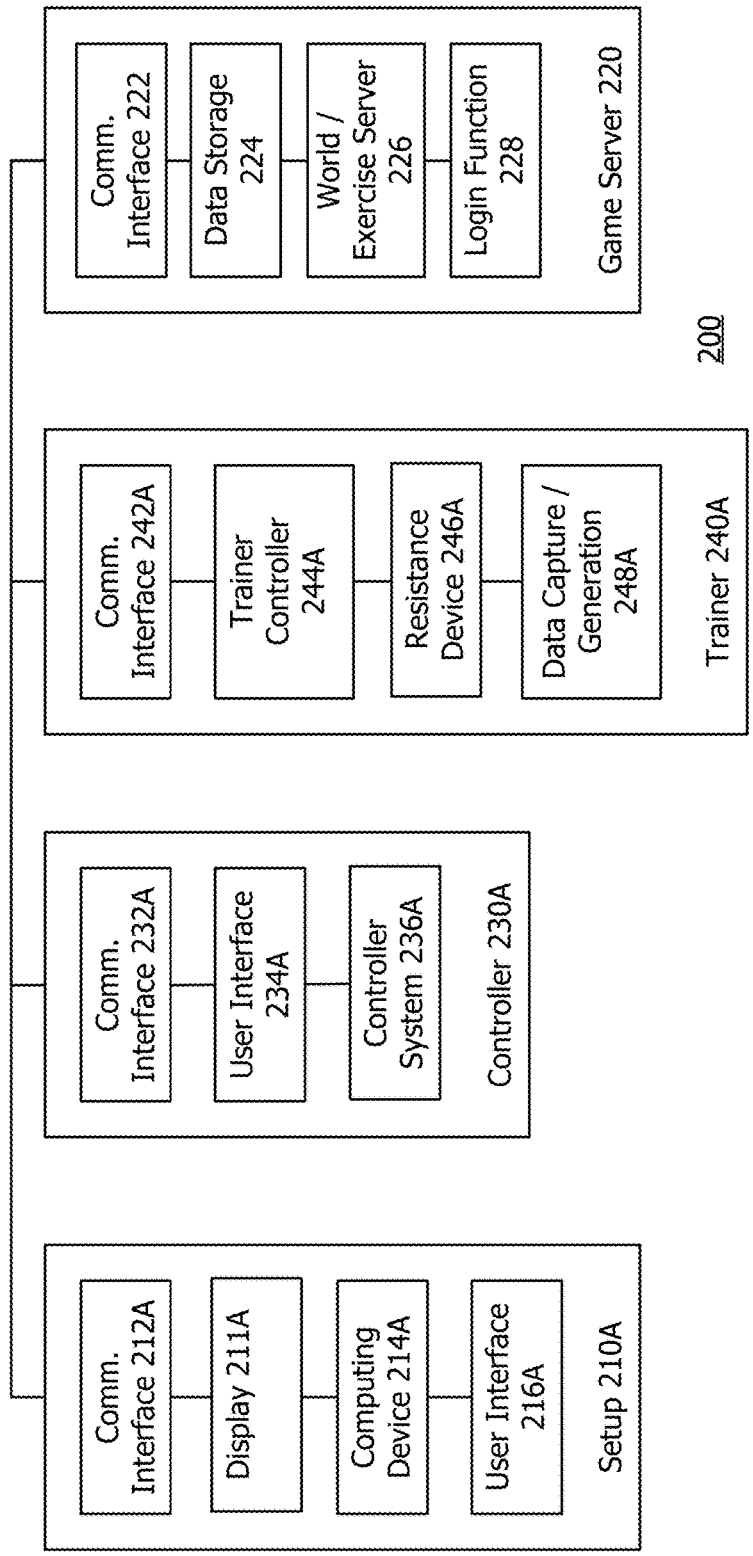
FIG. 2 is a functional diagram of an exercise device communications system.

FIG. 2 is a functional diagram of an exercise device communications system 200. The system 200 includes one of the setups, setup 210A, game server 220, controller 230A, and trainer 240A. The other two setups 110B and 110C would operate similarly to those described in FIG. 2 and will not be described separately here.

The setup 210A includes the display 211A, communications interface 212A, a computing device 214A, and a user interface 216A. The communications interface 212A is a software/hardware interface that enables the setup 210A to communicate with the game server 220, controller 230A and the trainer 240A. The particular hardware and/or protocol used for each communication may be different. So, for example, the controller 230A may communicate with the setup 210A using a short range wireless communications protocol such as Bluetooth®, or may be wired (for example, via USB) or may rely upon a local area wireless network protocol such as 802.11x. Other hardware connectivity options are available as well. However, the same communications protocol may be used over whatever hardware channel or carrier is used.

The communications interface 212A relies upon a modified Bluetooth Generic Attribute (GATT) profile. The Service UUID (universally unique identifier) for the new protocol described herein is 00000001-19CA-4651-86E5-FA29DCDD09D1. It is beneficial over existing options such as FTMS (Fitness Machine Service) protocol in including more expandability, greater options for back-and-fort communications, and being more secure, while also lowering overall bandwidth usage. A GATT profile identifies a particular Bluetooth communication transport protocol. If two devices interact that share a GATT profile, then they are able to communicate using that profile once it has been identified and a handshake process has completed.

The new protocol described in this disclosure is configured as a GATT Primary Service having three channels for communication: an asynchronous channel, a synchronous receive (RX) channel and a synchronous transmit (TX) channel. The asynchronous channel is primarily used for notification and therefore uses the NOTIFY property of the Bluetooth GATT profile. The asynchronous channel does not confirm receipt of any data sent using the channel and the data is sent in a stream on an as-needed basis. The RX channel uses the WRITE property of GATT Bluetooth and the RX channel uses the INDICATE property of GATT Bluetooth. These two channels rely upon sending data and expecting confirmations of receipt. Accordingly, only data which requires confirmation is sent using one of these wo channels. This protocol is defined in detail by Appendix A, attached hereto and incorporated by reference in its entirety. For purposes of this disclosure, no matter the hardware connection methodology or the bearer packet, the protocol described herein will be formed as set forth above and in Appendix A.

The Primary Service above may be characterized:

| Name | 16-bit UUID | Mandatory Properties | Optional Properties | Security | Maximum Length |
| --- | --- | --- | --- | --- | --- |
| Async | 0x0002 | NOTIFY | — | None | 128 |
| Sync RX | 0x0003 | WRITE | — | None | 128 |
| Sync TX | 0x0004 | INDICATE | — | None | 128 |

The simultaneous use of the RX, TX and asynchronous channels enables messages that require no response to simply be "streamed" from the server to the client via the asynchronous channel. In this way, the client need not confirm receipt as is typical with TCP/IP communications or with usual Bluetooth low energy. The types of messages sent on the asynchronous channel may be low-priority or may be repeated or altered frequently enough that confirmation is not required. As a result, energy is conserved by not handling all of the back-and-forth control messages for this type of communication. Simultaneously, the RX and TX channels can be used for data or information or notifications that must be acknowledged and typically must result in some change in the client and/or server. These operate in a much more traditional manner in this context, but are utilized only for critical communications between the client and/or server.

The three channels, RX, TX, and asynchronous, are capable of simultaneous engagement and operation such that data may be sent and/or received on any one or all of the three of the channels simultaneously or substantially simultaneously with one another. In practice, the channels may never be used exactly at the same time as one another. However, they will each be used throughout a connection between a server device and a client device to send and/or receive messages of the respective types identified herein for each channel. This configuration may entail having each of those channels available for use at the same time—e.g. simultaneously or substantially simultaneously with one another. As such, each of these channels may be configured to be open for simultaneous communication As used herein, the phrase "substantially simultaneously" means taking place within 1000 milliseconds of each other.

The packet format for when Bluetooth® is used to carry the protocol is:

| Protocol Opcode | Protocol Message PDU |
|---|---|
| 1 Byte | 0 to (BLUETOOTH_MAX_PACKET_LENGTH − 1) bytes |

Where BLUETOOTH_MAX_PACKET_LENGTH is defined as 240.

The packet format for when USB composite device class (CDC) is used to carry the protocol is:

| Data Length | Opcode | Protocol Message PDU |
|---|---|---|
| 1 Byte | 1 Byte | 0 to (USB_MAX_PACKET_LENGTH − 2) bytes |

Where USB_MAX_PACKET_LENGTH is defined as 128.

The packet format for when USB iAP2 (iPod Accessory Protocol 2) (e.g. for use with iPhones and iPads) is used to carry the protocol is:

| Data Length | Opcode | Protocol Message PDU |
|---|---|---|
| 1 Byte | 1 Byte | 0 to (USB_MAX_PACKET_LENGTH − 1) bytes |

Where USB_MAX_PACKET_LENGTH is defined as 128.

The packet format for when internet protocol (IP) (e.g. for use with ethernet, or 802.11x wireless) is used to carry the protocol is:

| Data Length | Opcode | Protocol Message PDU |
|---|---|---|
| 1 Byte | 1 Byte | 0 to (IP_MAX_PACKET_LENGTH − 2) bytes |

Where IP_MAX_PACKET_LENGTH is defined as 128.

The display 211A is described above. Display 211A is primarily to display to a user the ongoing training session or game.

The computing device 214A is preferably a part of display 211A, but in whatever case is in communications with display 211A to provide the ongoing training session or game. The computing device generates a user interface 216A on the display 211A (in the case of a touchscreen) or through other input methods and systems (e.g. buttons, controllers, remote controls, etc.) for the setup 110A.

The game server 220 is a computing device executing software that allows the game server 220 to operate as a communications interface 222, a data storage 224, a world/exercise server 226, and to provide a login function 228.

The communications interface 222 is substantially the same as that described with respect to element 212A above. However, the game server 220 will almost certainly communicate through one or more ethernet cables to an internet pipeline with connectivity to multiple setups, like setup 210A. The data sent and received by the game server 220 using the communications interface 222 is less voluminous than that sent between a setup 210A and controller 230A and trainer 240A, so the communications interface 222 may rely upon traditional TCP/IP datagrams and associated services to communicate with the computing device 214A for a given setup 210A.

The data storage 224 may store such information as the game world environments, textures, and training sessions or competitions to take place in the game world. The data storage 224 may store information about each user (e.g. accomplishments, personal records, etc.) and any competition outcomes involving any users.

The world/exercise server 226 is software operating on a computing device that serves to allow a plurality of setups, like setup 210A, to connect to the game server 220 and engage with the world and engage in exercise. This may be a streaming server of streamed pre-recorded classes for a spinning or running or weight training class. This may be a virtual world to which players connect to use avatars within the game world to move within while engaged in exercise. Various forms of this world/exercise server 226 may be envisioned.

The login function 228 may use the data storage 224 to store authentication information suitable to ensure security of the game server 220 and to ensure that setups, like setup 210A, that connect to the game server 220 have paid an associated membership fee and are otherwise authorized to access the game server 220. The login function 228 may ensure that users are authenticated and are able to access the game server 220.

The controller 230A includes a communications interface 232A, a user interface 234A, and a controller system-on-a-chip 236A. The communications interface 242A operates substantially the same as communications interface 212A. However, preferably, the communications interface 232A of the controller 230A acts as a Bluetooth low energy server reliant upon the GATT profile which defines the protocol disclosed herein (referred to herein as a "GATT server"), while the communications interface 212A of the setup 210A operates as the counterpart (referred to herein as a "GATT client") client. The controller may communicate with software executing on the computing device 214A to implement the communications interface 212A to control various functions, including functions of the trainer 240A. Notably, the controller 230A generally does not communicate directly with the trainer 240A.

The user interface 234A of the controller 230 may be one or more buttons, joy sticks, analog sticks, triggers, motion controls, touchscreen display control implemented in software, or other controls implemented on the controller 230A. In a preferred embodiment, the controller 230 is one or more video game system-like controllers used to engage in specific functions with respect to the game or other software operating on the computing device 214A of the setup 210A. The controller may take the form of a traditional brake lever for a bicycle and/or a traditional gear shift lever, ratchet, or trigger, which may be translated into digital signals transmitted over the communications interfaces 232A, 212A to cause the computing device 214A to instruct the trainer 240A to operate accordingly.

The controller system 236A is a computing device (FIG. 2) responsible for operating as a GATT server and instructing the communications interface 232A what signals to transmit to the setup 210A. In more complex systems, the SoC 236A may perform other functions such as rendering a display, translating touch contact, detecting and interpreting motion of the controller 230A or the like.

The trainer 240A includes a communications interface 242A, a trainer system-on-a-chip 244A, a resistance device 246A, and data capture/generation 248A. The communications interface 242A performs substantially the same function as the communications interface 232A of the controller 230A. As with the controller 230A, the trainer 240A communications interface 242A generally does not communicate directly with any other device except the associated setup 210A communications interface 212A.

The trainer controller 244A is a computing device that operates to intelligently control the trainer 240A as directed by software operating on the setup 210A. The trainer SoC 244A also enables the protocol to be transmitted and received via the communications interface 242A.

The resistance device 246A is a device to add resistance (or negative resistance) to a moving object (e.g. a wheel or axle). The resistance device 246A is described as a "resistance" device, but could merely add speed or simulate weight in the case of pulley-based, weight training. There exist other resistance devices such as air or water resistance (e.g. used in rowing machines), but for a number of reasons eddy current brake is typically the chosen resistance device 246A no matter the type of exercise being simulated.

The data capture/generation 248A may be a part of the trainer SoC 244A, but in general is functions designed to capture the data associated with the ongoing exercise and to send that data (using the communications interface 242A) back to the setup 210A for eventual transmission to the game server 220 to update the game and/or race and/or training session. The types of data captured may be speed, cadence relative to the applied resistance, the amount of force by the user, or similar information. Associated sensors may be used (e.g. force sensors) or the data may be calculated from available variables (e.g. force, speed, cadence, etc.).

Figure 3:
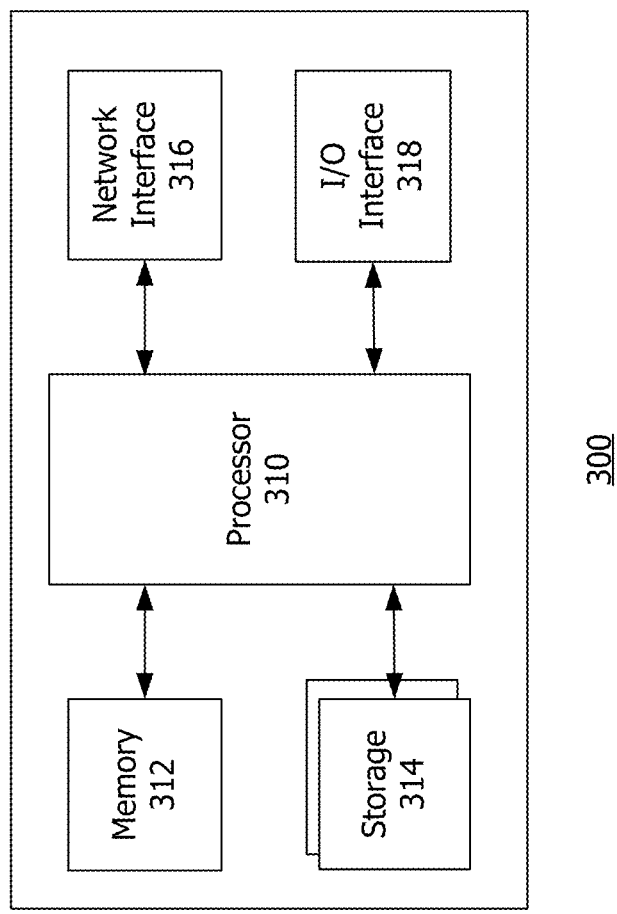
FIG. 3 is a functional diagram of a computing device.

Turning now to FIG. 3, a block diagram of a computing device 300 is shown. The computing device 300 may be representative of the server computers, client devices, mobile devices and other computing devices discussed herein. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 may have a processor 310 coupled to a memory 312, storage 314, a network interface 316 and an I/O interface 318. The processor 310 may be or include one or more microprocessors and application specific integrated circuits (ASICs).

The memory 312 may be or include RAM, ROM, DRAM, SRAM and MRAM, and may include firmware, such as static data or fixed instructions, BIOS, system functions, configuration data, and other routines used during the operation of the computing device 300 and processor 310. The memory 312 also provides a storage area for data and instructions associated with applications and data handled by the processor 310. As used herein, the word memory specifically excludes transitory medium such as signals and propagating waveforms.

The storage 314 may provide non-volatile, bulk or long-term storage of data or instructions in the computing device 300. The storage 314 may take the form of a disk, tape, CD, DVD, SSD, or other reasonably high capacity addressable or serial storage medium. Multiple storage devices may be provided or available to the computing device 300. Some of these storage devices may be external to the computing device 300, such as network storage or cloud-based storage. As used herein, the word storage specifically excludes transitory medium such as signals and propagating waveforms.

The network interface 316 is responsible for communications with external devices using wired and wireless connections reliant upon protocols such as 802.11x, Bluetooth®, Ethernet, satellite communications, and other protocols. The network interface 316 may be or include the internet.

The I/O interface 318 may be or include one or more busses or interfaces for communicating with computer peripherals such as mice, keyboards, cameras, displays, microphones, and the like.

Figure 4:
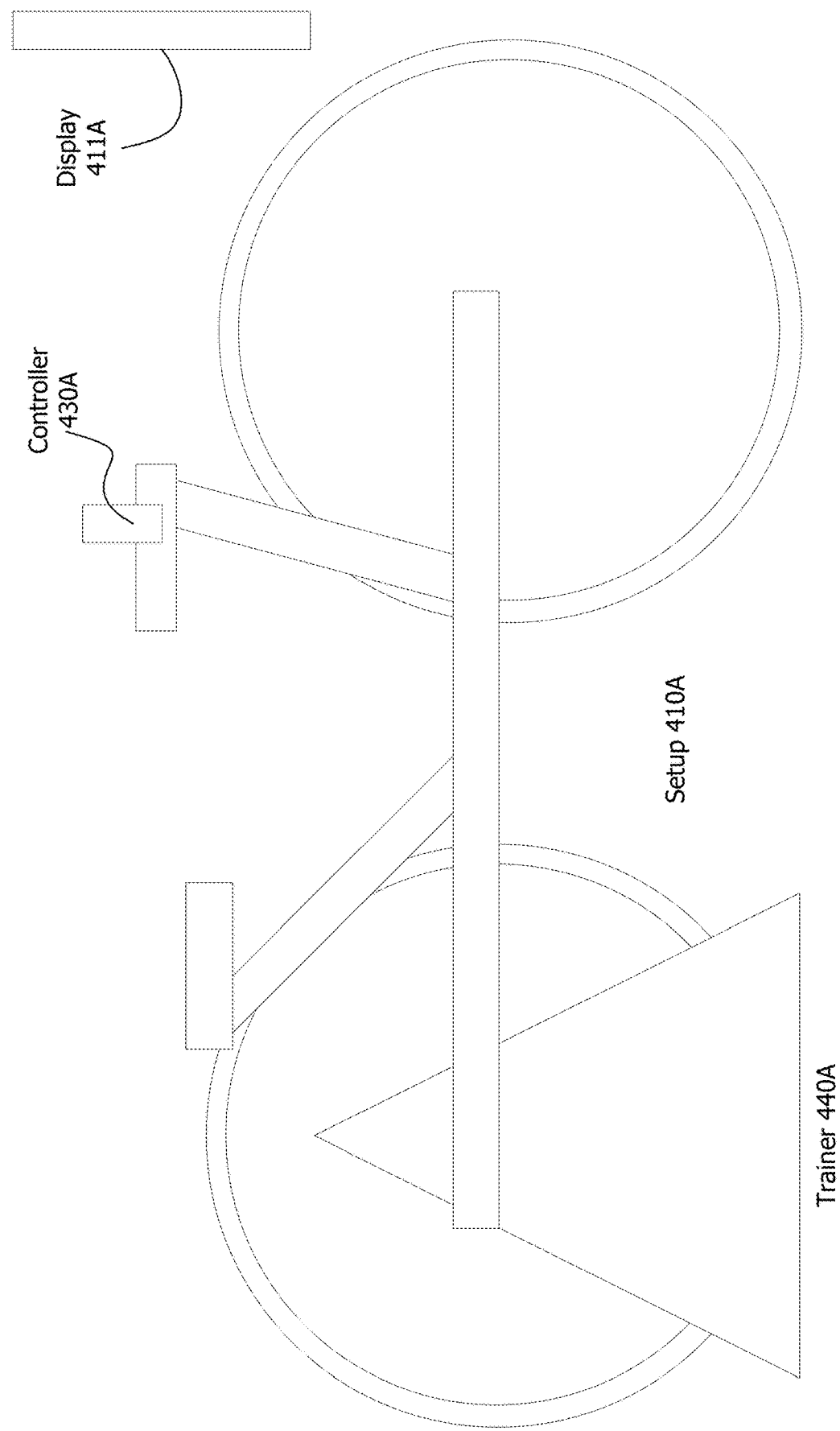
FIG. 4 is an example of an exercise device.

FIG. 4 is an example of an exercise device setup 410A which may be the setup 110A or 210A. The setup 410A includes a display 411A, a controller 430A, and a trainer 440A. Setups B and C (shown in FIG. 1) are not discussed with reference to FIG. 4 as their functions are not substantially distinct therefrom). The display 411A is shown in front of a rider. The controller 430A may be, for example, attached to the handlebars of the setup 410A. Though shown as a brake or shift controller, the controller 430A may take different forms in different exercises or setups. And, though discussed as a "controller" the same communications protocols may be used with other devices that operate in some sense as a "controller" but may not take that form. For example, the same devices that provide a tilt function for bicycles or treadmills to simulate uphill or downhill rides/runs may in some sense be a "controller" as discussed herein in the sense that they communicate with the computing device 214A of the setup 210A in the same way as a controller, using the same protocols. Automatically controlled fans, side-to-side lean hardware, and other, similar hardware may likewise be a "controller," as disclosed herein, reliant on the same communications protocol.

The trainer 440A is a trainer as discussed above. The trainer 440A may likewise rely upon the same communications protocol described herein.

Figure 5:
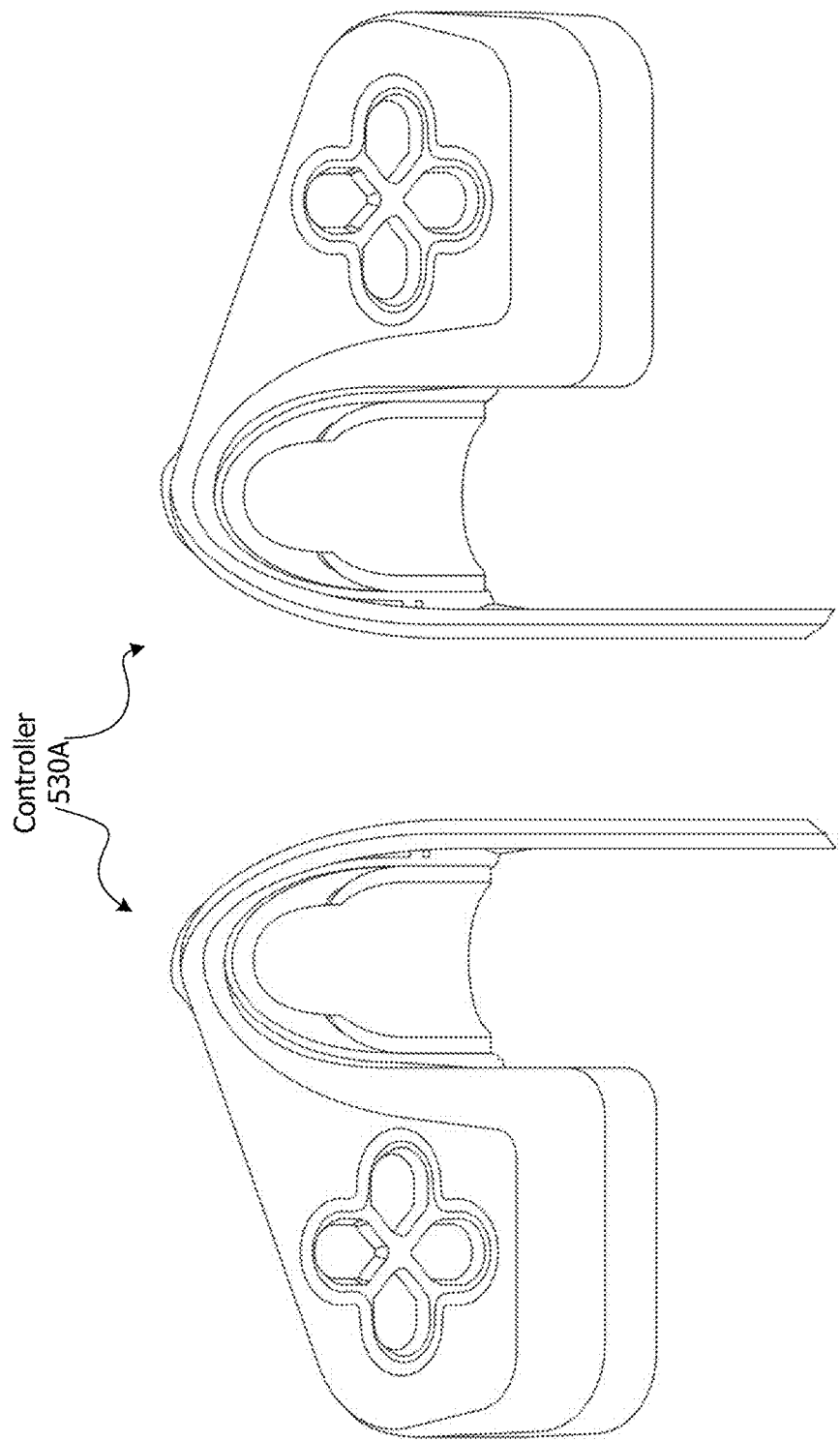
FIG. 5 is an example of a handheld controller pair.

FIG. 5 is an example of a handheld controller 530A pair. Here, the controller is designed to sit on handlebars of a bicycle and to provide triggers on the back of the controller, with a traditional "d-pad" controller on the front/top of the controller. Controllers of various forms may be used without departing from the intended scope of the communications protocol used herein or the relay-like functionality of ensuring that the controller 530A communicates with the software operating the game world on the setup 410A, rather than directly with, for example, the trainer 440A.

Description of Processes

Figure 6:
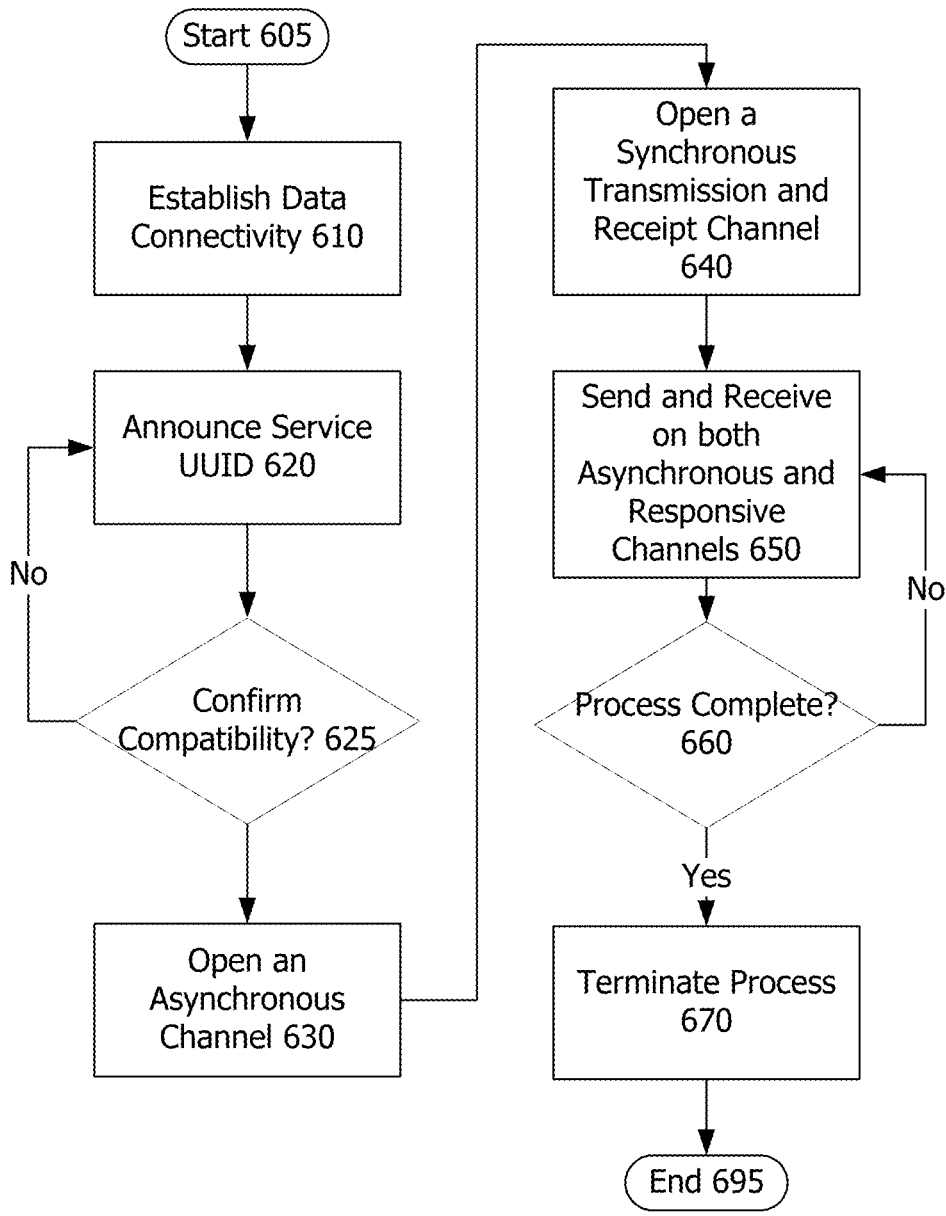
FIG. 6 is flowchart of a process of communication using a communications protocol.

FIG. 6 is flowchart of a process of communication using a communications protocol. The process begins at 605 and ends at 695. The process takes place for each communications device reliant upon the protocol and ends when the device is disconnected or the process terminates.

Following the start 605, the process begins with establishment of connectivity at 610. Here, the transport layer is allocated and connected by both the client and the server. In a typical case, the controller device will operate as the server and the computing device of the setup (e.g. setup 210A of FIG. 2) will operate as the client for this protocol. This step is merely to establish the transport bearer for the protocol to communicate.

Thereafter, the UUID is announced by the server at 620. Here, the server announces its availability to serve as a server for the protocol and searches for compatible responses from available clients. If no suitable response is received ("no" at 625), then the process continues with ongoing announcements.

If a suitable response indicating compatibility is received ("yes" at 625), then the process continues with the opening of the asynchronous channel at 630. This channel is used for data that is simply sent in a stream to the client. This data is typically from a device operating as a control device for the world and/or other attached devices (e.g. trainers). The important characteristic of this channel is that notifications sent on this channel require no response from the client. Examples of such communications include: notifications from the exercise device, notifications from the software to the exercise device, event flagging messages, notifications from a controller device, notifications from a battery device, notifications indicating wireless internet status, lighting and sound effect event status notifications, intermediate game state events, notifications from a secondary controller device, notifications related to a battery status of a secondary exercise device, notifications that the secondary exercise device has paired with the software, notifications that the exercise device or the secondary exercise device has engaged a virtual gear shift process in software, notification regarding a spindown of the exercise device or a secondary exercise device, and notification that the software has lost control over the exercise device or secondary exercise device.

Next, a synchronous transmission (TX) channel and a synchronous receipt (RX) channel are opened at 640. The transmission (TX) channel is setup on the client device, the receipt (RX) channel is setup on the server device to receive notifications from the client device(s). These two channels operate in a mode wherein an acknowledgement is expected in the general form of an ACK/NACK or other response indicating or confirming receipt of the message. This is unlike the asynchronous channel where no response is expected. This is typically because receipt of or response to the data is not necessary for ongoing operation of a device to which the message of this type is sent.

The TX channel is used for the server to respond to a connected client. Examples of TX channel responses include: a setting for the server device set by the software, a setting for the software or for the exercise device to operate, a request to have the server device operate as a bridge between the software and a third device, a request to have the server device power off, a calibration setting for a touch surface controlled by the server device, a calibration setting for the server device or an exercise device, a request to reset the server device, a request to cause a lighting element to have a selected setting, animation, or status, a request to set a setting for the exercise device, a request to set one or more settings for the exercise device, and a request to begin a spindown of the exercise device.

The RX channel is used to receive messages from a connected client. Examples of RX channel requests include: a notification regarding development information or status from the software, a notification regarding a configuration of the exercise device, a status of an ongoing data transfer from the server device to the client device, a notification of the status of lighting elements controlled by the exercise device, a notification on the diagnostic status of the exercise device, a notification of the status of a battery associated with the exercise device, a notification of a version of the exercise device, a notification regarding the SSID of a wireless network, a notification of a version of a secondary exercise device, a notification regarding an error in lighting elements controlled by the exercise device, a notification regarding the status of a setting of the exercise device or the secondary exercise device, a notification regarding a touch surface associated with the exercise device or the secondary exercise device, a notification regarding an updating status for firmware updates to the exercise device or the secondary exercise device, notifications from a log associated with the exercise device or the secondary exercise device, notifications indicating a fault with the exercise device or the secondary exercise device, notification regarding a calibration or calibration status for the exercise device or the secondary exercise device, notifications indicating that a firmware update has completed and is now locked, notifications related to information for the secondary exercise device, notifications identifying a particular version of the secondary exercise device, and notifications indicating that the three-part communication connection is supported by the server device.

The process continues with both channel types being open on all three channels. So, sending messages takes place on the asynchronous channel\ while sending and receiving messages on the RX and TX channels takes place at 650. These communications continue while the exercise device (e.g. a controller) is connected to the computing device.

If the process continues ("no" at 660), meaning that the exercise is ongoing or the device remains connected, then the channels remain open and transmitting and receiving.

If the process is complete ("yes" at 660), then the process is terminated at 670. Here the device maybe disconnected, or all devices may be powered off. Or the exercise may complete and the controller may disconnect to conserve power.

Figure 7:
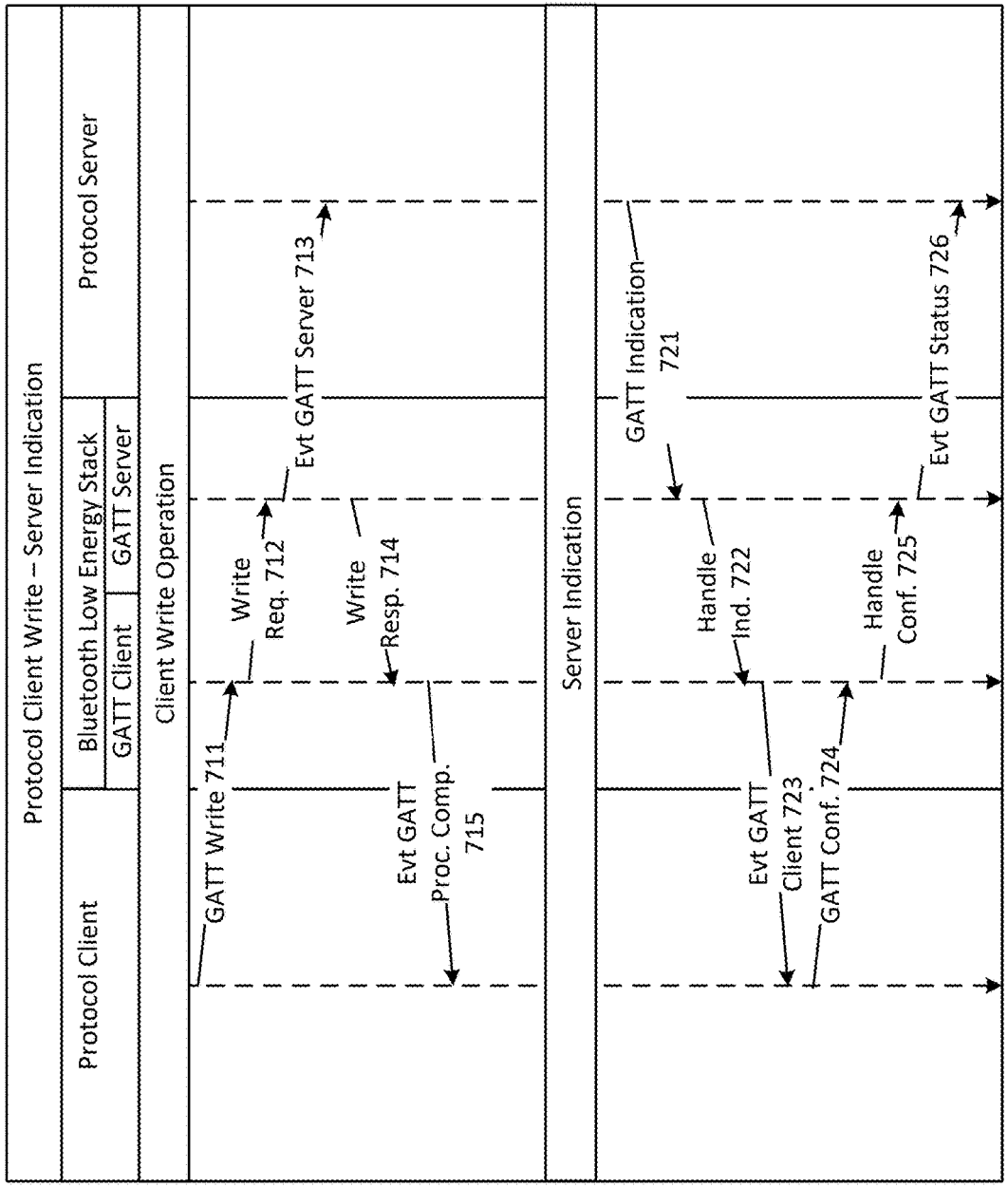
FIG. 7 is a process flow for a communications protocol of a client write and a server indication.

FIG. 7 is a process flow for a communications protocol of a client write and a server indication. FIG. 7 includes two different examples of acknowledged communications. First, a client write operation is shown, beginning with a client requesting a GATT write at 711. The write request is encapsulated using the Bluetooth® low energy typical communication stack and a write operation is requested at 712. This is the client device (e.g. the software running Zwift) writing to the server (e.g. a controller device or potentially a trainer device). The GATT write 712 is received and the server determines that it is a GATT write event 713 which then completes the write. This data may be the software instructing the controller on a data setting or calibration setting, for example.

Then, the GATT write response 714 is sent by the Bluetooth low energy stack at 714. This is an acknowledgement of the requested write by the client. The client then receives the event indicating that the GATT process is complete at 715. The portions outside the Bluetooth low energy stack are defined by the negotiated GATT. The portions inside the Bluetooth low energy stack are merely the transport layer packaging the GATT operations communications for transmission and receipt. This process relies upon the RX acknowledged channel.

The next example operation is a server indication. Here, the server (e.g. a controller) is providing a data element to the client (e.g. the software) using the protocol. First, a GATT indication is sent through the Bluetooth low energy stack at 721. The GATT handle indication is sent at 722. At the client (e.g. the software), the GATT event is provided to the client at 723. This may be, for example, an indication of a button press or a data element (e.g. a calibration setting). The GATT expected confirmation is sent at 724 for handling through the Bluetooth low energy stack. This confirms that the GATT event, one requiring confirmation, is now completed by the client. This GATT handle confirmation by the Bluetooth low energy stack and is transmitted to the server at 725. Then, the expected GATT event status is received at 726, confirming that the indication has been received and need not be sent a second time. This process relies upon the TX acknowledged channel.

Figure 8:
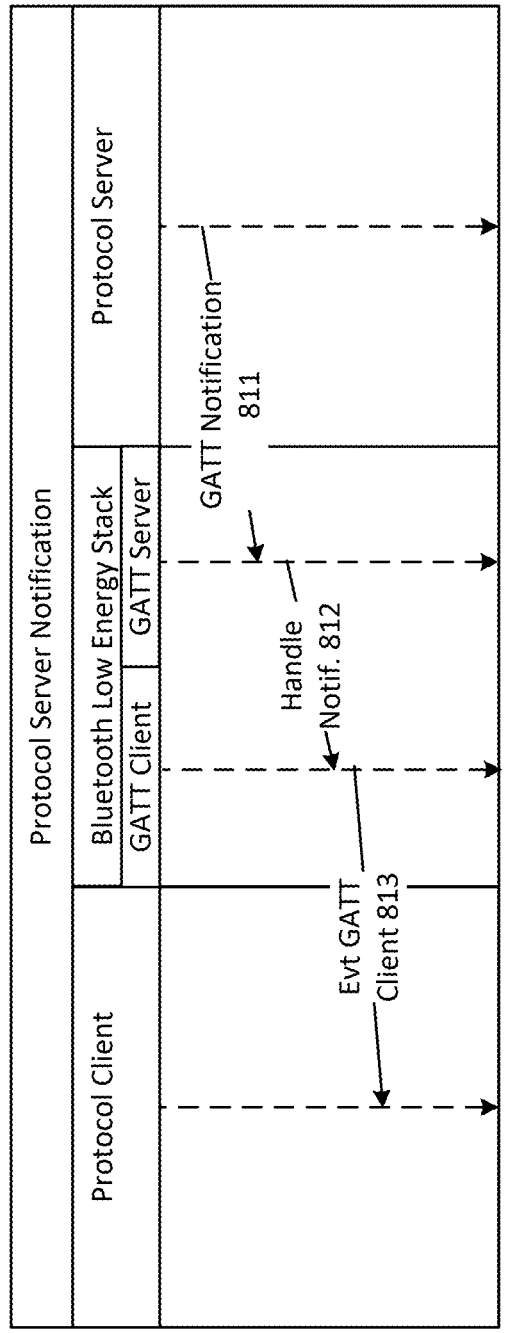
FIG. 8 is a process flow for a communications protocol of a server notification.

FIG. 8 is a process flow for a communications protocol of a server notification. This is in contrast to the RX and TX channel usage above in FIG. 7 and relies only upon the asynchronous channel. Here, this is merely a notification and, in general, a notification is low enough priority and merely useful information rather than critical information, that it may be streamed and need not be acknowledged.

Here, a GATT notification is sent by the server (e.g. a controller or trainer) at 811. The notification may be a button press on a controller or a change in speed of a trainer or bicycle. The GATT handle notification is handed to the Bluetooth low energy stack for transmission which is at 812. The message is thereby transmitted from server to client. Then, the client's receipt of the expected GATT event is handled by the client at 813. If the message is received (likely), then the process continues with that new data. If it is not received (unlikely), then the client continues operating as it was before without that message. The message can be re-sent later or may merely be repeated when the event happens yet again. In either case, the message is not acknowledged by the client.

Figure 9:
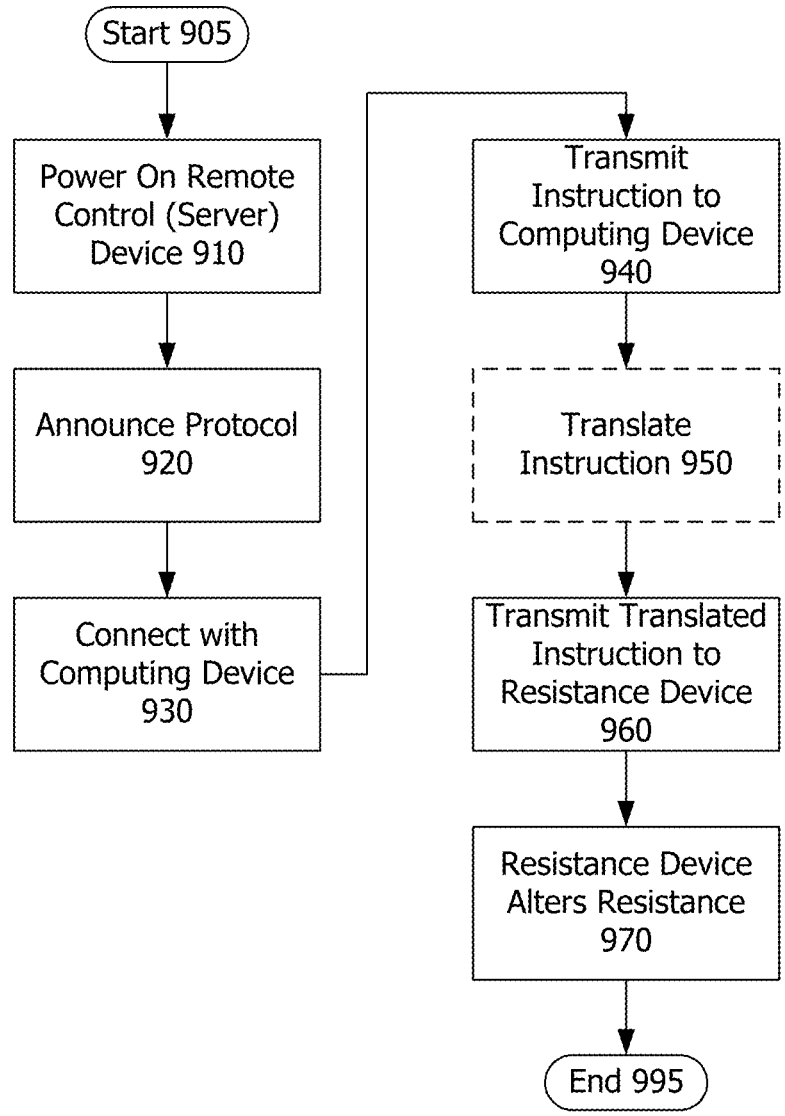
FIG. 9 is a flowchart of a process of communications in an exercise device communications system.

FIG. 9 is a flowchart of a process of communications in an exercise device communications system. The process begins at 905 and ends at 995. This is the generalized process of connection to and use of a control device in conjunction with software. This may be used, for example, in the context of a controller device (or other exercise device) used in connection with a simulated environment such as with Zwift. Preferably, the system relies upon the protocol for communication described above and in Appendix A.

Following the state at 905, the process begins with powering on the remote control (e.g. the server) device at 910. The control includes embedded firmware setting forth its capabilities and its operation, and describing the protocols used for communication with client devices like the software.

Next, the protocol for communications is announced at 920. Here, the server device may continuously and repeatedly announce its protocol(s) used for communication. This enables compatible client devices to discover the server.

Once discovered by the client (e.g. software), the server device is connected to the computing device operating as the client at 930. Here, the controller negotiates the transport bearer (e.g. Bluetooth low energy, USB, 802.11x wireless, or some other connection), then negotiates connection using the protocol. This process may also involve the opening of the TX, RX, and asynchronous channels discussed above.

Once that process is complete, the client and server communications have been set up and the channels may be used for communications.

The server (e.g. a controller) can transmit an instruction for a third device (e.g. a trainer) connected to the computing device (e.g. software operating as a client) at 940. This process may be an indication of a desired reduction or increase in resistance or speed, an instruction to undertake a virtual "gear shift" or a virtual "brake" operation whereby the trainer simulates a change in gear or brake, or may be a request to "steer" the virtual bike or treadmill or an avatar within the virtual world. This instruction is sent by the controller (e.g. server) to the computing device (e.g. software operating on the display 111A).

In the past, many systems with controllers have relied upon the trainer itself or the indoor cycle or the treadmill to operate as the primary hub. Here, however, it is desirable for the computing device—the device operating the associated software for a virtual game world or upon which classes are being offered or streamed—to operate as a hub for all devices to connect. The protocol (Appendix A) may be used for communications with these devices, which each device (e.g. each trainer, each indoor cycle, each trainer, each controller, each "lean" or "tilt" device, and any other fitness-related devices used with the software) connecting to the central computing device operating as the client.

At 940, the instruction may be to "shift gears" virtually and the software is so instructed to do so. That instruction may be transmitted using the protocol described above. That instruction may or may not be suitably formatted for subsequent transmission to a connected trainer device (e.g. a resistance device) to enable appropriate operation.

In such a case, the instruction optionally may be translated at 950 by the computing device (e.g. the software operating on the computing device) to conform to a format desired by the trainer. There are tens of trainers available in the world, there are hundreds of indoor cycles and treadmills. These types of instructions may require formatting to appropriately be transmitted from the receiving client (e.g. the software operating on the computing device) to a second server device operating on the trainer, indoor cycle, treadmill, etc.

The instruction may then be transmitted to the resistance device at 960. As indicated above, the "resistance" device may in fact be a treadmill which merely alters speed, and not resistance. But, in general, this will be the trainer or weight resistance cable system that is being instructed by the controller, through the computing device.

There are various ways in which the instruction may be transmitted to the resistance device at 960. The instruction may be an instruction to apply a selected one of: a numerical resistance to be applied by the resistance device, a percentage reduction or increase in resistance to be applied by the resistance device, a numerical reduction or increase in resistance to be applied by the resistance device, a series of numerical resistances to be applied by the resistance device, or a waveform or portion thereof describing a variable resistance over a period of time to be applied by the resistance device. The instruction may be a selected one of: an indication of a particular gear selection to which to transition the resistance device, an indication of either a desire to shift up or down one gear from a presently-selected gear selection by the resistance device, a request to apply a selected amount of braking force by the resistance device, or a request to apply a selected intermittent signal, embodying a simulated road surface, by the resistance device. The signal may merely be to increase resistance or reduce it, to steer, to move between selections, to move a device (e.g. a setup) up and down or elevate one end or another of a setup. The instruction may be a selected one of: an indication of a particular gear selection to which to transition the resistance device and an indication of either a desire to shift up or down one gear from one gear presently in use by the resistance device to another gear.

Thereafter, the resistance device may alter the resistance at 970 (or the speed, in the case of a treadmill). At this step, the "controller" is controlling the trainer or treadmill, but the central hub is the computing device operating the software. In this way, the software may know the current state of all of the connected devices (e.g. controllers, trainers, inclines or lean-capable accessories, treadmills, weights, etc.). And, the communications protocol may be made more secure for purposes of competitive racing and ensuring uniformity. The overall systems may also be made more uniform, reliant upon a new standardized protocol for the various pieces of information passed back and forth during a training or race session.

The process may then end at 995.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of operating an exercise device for use in conjunction with software, the method comprising:
   establish a three-part communication connection between a server device and a client device, wherein:
   a first connection is an asynchronous channel for transmission of messages that need not be acknowledged by a receiving device,
   a second connection is a synchronous transmission channel for transmission of messages that require a response from a receiving device,
   a third connection is a synchronous receiving channel for receipt of messages that are responses to a message that requires a response;
   transmit a first set of data over the first connection, the first set of data being a stream of data that is relevant to operation of the client device in conjunction with the server device, but for which confirmation of receipt is not required; and
   substantially simultaneously transmit or receive a second set of data, comprising a subset of a predetermined set of requests and responses, using at least one of the second and third connections, the second set of data comprising data which requires confirmation of receipt and may require a response.

2. The method of claim 1 wherein the server device is the exercise device and the client device is a computing device operating using the software.

3. The method of claim 1 wherein the three-part communication connection joins the server device and the client device by a selected one of: universal serial bus (USB), 802.11x wireless, and Bluetooth®.

4. The method of claim 3 wherein a format for a packet used by the three-part communication connection that relies upon a custom implementation of Bluetooth® is:
   a single byte operations code for the packet; and
   a message portion of a length one less byte than the three-part communication connection is capable of carrying.

5. The method of claim 3 wherein a format for a packet used by the three-part communication connection that relies upon USB or 802.11x wireless connection is:
   a single byte identifying the length of the packet;
   a single byte operations code for the packet; and
   a message portion of a length one or two less bytes than the three-part communication connection is capable of carrying.

6. The method of claim 1 wherein the first connection is used for transmitting messages selected from the group comprising: notifications from the exercise device, notifications from the software to the exercise device, event flagging messages, notifications from a controller device, notifications from a battery device, notifications indicating wireless internet status, lighting and/or sound effect event status notifications, intermediate game state events, notifications from a secondary controller device, notifications related to a battery status of a secondary exercise device, notifications that the secondary exercise device has paired with the software, notifications that the exercise device or the secondary exercise device has engaged a virtual gear shift process in software, notification regarding a spindown of the exercise device or a secondary exercise device, and notification that the software has lost control over the exercise device or secondary exercise device.

7. The method of claim 1 wherein the second connection is used for transmitting messages selected from the group comprising: a setting for the exercise device set by the software, a setting for the software for the exercise device to operate, a request to have the exercise device operate as a bridge between the software or a third device and a fourth device, a request to have the exercise device power off, a calibration setting for a touch surface controlled by the exercise device, a calibration setting for the exercise device or a secondary exercise device, a request to reset the exercise device, a request to cause a lighting element to have a selected setting, animation, or status, a request to set a setting for the secondary exercise device, a request to set one or more settings for the exercise device or for the secondary exercise device, and a request to begin a spindown of the exercise device or a secondary exercise device.

8. The method of claim 1 wherein the third connection is used for receiving messages selected from the group comprising: a notification regarding development information or status from the software, a notification regarding a configuration of the exercise device, a status of an ongoing data transfer from the server device to the client device, a notification of the status of lighting elements controlled by the exercise device, a notification on the diagnostic status of the exercise device, a notification of the status of a battery associated with the exercise device, a notification of a version of the exercise device, a notification regarding the SSID of a wireless network, a notification of a version of a secondary exercise device, a notification regarding an error in lighting elements controlled by the exercise device, a notification regarding the status of a setting of the exercise device or the secondary exercise device, a notification regarding a touch surface associated with the exercise device or the secondary exercise device, a notification regarding an updating status for firmware updates to the exercise device or the secondary exercise device, notifications from a log associated with the exercise device or the secondary exercise device, notifications indicating a fault with the exercise device or the secondary exercise device, notification regarding a calibration or calibration status for the exercise device or the secondary exercise device, notifications indicating that a firmware update has completed and is now locked, notifications related to information for the secondary exercise device, notifications identifying a particular version of the secondary exercise device, and notifications indicating that the three-part communication connection is supported by the server device.

9. The method of claim 1 wherein the three-part communication connection is established when at least one of the following conditions is met:
universal serial bus (USB) enumeration is completed and a communications device class is selected;
the exercise device is connected to a computing device operating the software;
a custom implementation of Bluetooth®, compatible with the software and indicating that the exercise device implements the custom implementation of Bluetooth® is discovered by the software operating on the computing device and is configured to open the three-way communications connection; and
a TCP/IP session is established between the exercise device and the software operating on the computing device, and a port is configured to transmit wireless TCP data.

10. A method of operating a server device for use in conjunction with software operating on a client device to engage in exercise, the method comprising:
establish a three-part communication connection between the server device and the client device, wherein:
a first connection is an asynchronous channel for transmission of streamed data to a receiving device,
a second connection is a transmission channel for transmission of messages that require a response from a receiving device,
a third connection is a receiving channel for receipt of messages that are responses to a message that requests a response; and
substantially simultaneously communicate a first set of data over the first connection and a second set of data over at least one of the second connection and the third connection with both the first and the second set of data passing between the server device and the client device using the three-part communication connection.

11. The method of claim 10 wherein the server device is the exercise device and the client device is a computing device operating using the software.

12. The method of claim 10 wherein the three-part communication connection joins the server device and the client device by a selected one of: universal serial bus (USB), 802.11x wireless, and Bluetooth®.

13. The method of claim 12 wherein a format for a packet used by the three-part communication connection that relies upon a custom implementation of Bluetooth® is:

a single byte operations code for the packet; and
a message portion of a length one less byte than the three-part communication connection is capable of carrying.

14. The method of claim 12 wherein a format for a packet used by the three-part communication connection that relies upon USB or 802.11x wireless connection is:
a single byte identifying the length of the packet;
a single byte operations code for the packet; and
a message portion of a length one or two less bytes than the three-part comunication connection is capable of carrying.

15. The method of claim 10 wherein the first connection is used for transmitting messages selected from the group comprising: notifications from the server device, notifications from the software to the server device, event flagging messages, notifications from a controller device, notifications from a battery of the controller device, notifications indicating wireless internet status, lighting and sound effect event status notifications, intermediate game state events, notifications from a secondary controller device, notifications related to a battery status of an exercise device, notifications that the exercise device has paired with the software, notifications that the exercise device has engaged a virtual gear shift process in software, notifications regarding a spindown of the exercise device, and notification that the software has lost control over the exercise device.

16. The method of claim 10 wherein the second connection is used for transmitting messages selected from the group comprising: a setting for the server device set by the software, a setting for the software for the exercise device to operate, a request to have the server device operate as a bridge between the software or a third device and a fourth device, a request to have the server device power off, a calibration setting for a touch surface controlled by the server device, a calibration setting for the server device or an exercise device, a request to reset the server device, a request to cause a lighting element to have a selected setting, animation, or status, a request to set a setting for the exercise device, a request to set one or more settings for the exercise device, and a request to begin a spindown of the exercise device.

17. The method of claim 10 wherein the third connection is used for receiving messages selected from the group comprising: a notification regarding development information or status from the software, a notification regarding a configuration of the server device, a status of an ongoing data transfer from the server device to the client device, a notification of the status of lighting elements controlled by the server device, a notification on the diagnostic status of the server device, a notification of the status of a battery associated with the server device, a notification of a version of the server device, a notification regarding the SSID of a wireless network, a notification of a version of an exercise device, a notification regarding an error in lighting elements controlled by the server device, a notification regarding the status of a setting of the serve device or the exercise device, a notification regarding a touch surface associated with the server device or the exercise device, a notification regarding an updating status for firmware updates to the server device or the exercise device, notifications from a log associated with the server device or the exercise device, notifications indicating a fault with the server device or the exercise device, notification regarding a calibration or calibration status for the server device or the exercise device, notifications indicating that a firmware update has completed and is now locked, notifications related to information for the exercise device, notifications identifying a particular version of the exercise device, and notifications indicating that the three-part communication connection is supported by the server device.

18. The method of claim 10 wherein the three-part communication connection is established when at least one of the following conditions is met:
    universal serial bus (USB) enumeration is completed and a communications device class is selected;
    the server device is connected to a computing device operating the software;
    a custom implementation of Bluetooth®, compatible with the software and indicating that the server device implements the custom implementation of Bluetooth® is discovered by the software operating on the computing device and is configured to open the three-way communications connection; and
    a TCP/IP session is established between the server device and the software operating on the computing device, and a port is configured to transmit wireless TCP data.

19. A system comprising a computing device operating as a server using server software, the server software executing on a processor accessible to the computing device to cause the processor to:
    establish a three-part communication connection between the computing device and a client device, wherein:
        a first connection is an asynchronous channel for transmission of streamed data to the client device,
        a second connection is a transmission channel for transmission of messages that require a response from the client device,
        a third connection is a receiving channel for receipt of messages that are responses to a message that requests a response;
    substantially simultaneously communicate data over the first connection and at least one of the second and third connections with both the first and the second set of data passing between the computing device and the client device using the three-part communication connection.

20. The system of claim 19 wherein the computing device is selected from th e group comprising: a handheld controller, a bicycle trainer, an indoor cycle, a rowing machine, a treadmill, a resistance weight training device, a frame of an exercise device, a bicycle frame or portion thereof, a heart monitor, a bike computer, a device for simulating pitch or yaw of an exercise device, a device for physically simulating an environment in which exercise is taking place, and a set of lighting components used in connection with an exercise software.

* * * * *

UNITED STATES PATENT AND TRADEMARK OFFICE
CERTIFICATE OF CORRECTION

| | | |
|---|---|---|
| PATENT NO. | : 12,465,816 B2 | Page 1 of 1 |
| APPLICATION NO. | : 18/334105 | |
| DATED | : November 11, 2025 | |
| INVENTOR(S) | : Alexandru Andreescu and Davide Pollarolo | |

It is certified that error appears in the above-identified patent and that said Letters Patent is hereby corrected as shown below:

In the Claims

Column 22, Line 11 replace "comunication" with --communication--.

Column 24, Line 16 replace "th e" with --the--.

Signed and Sealed this
Ninth Day of December, 2025

John A. Squires
*Director of the United States Patent and Trademark Office*